(12) United States Patent
Palanigounder et al.

(10) Patent No.: US 11,553,381 B2
(45) Date of Patent: Jan. 10, 2023

(54) METHOD AND APPARATUS FOR MULTIPLE REGISTRATIONS

(71) Applicant: QUALCOMM Incorporated, San Diego, CA (US)

(72) Inventors: Anand Palanigounder, San Diego, CA (US); Adrian Edward Escott, Reading (GB); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 680 days.

(21) Appl. No.: 16/246,349

(22) Filed: Jan. 11, 2019

(65) Prior Publication Data
US 2019/0223063 A1    Jul. 18, 2019

Related U.S. Application Data

(60) Provisional application No. 62/617,065, filed on Jan. 12, 2018.

(51) Int. Cl.
*H04W 12/06*    (2021.01)
*H04W 36/00*    (2009.01)
(Continued)

(52) U.S. Cl.
CPC ..... *H04W 36/0038* (2013.01); *H04W 12/041* (2021.01); *H04W 12/0431* (2021.01);
(Continued)

(58) Field of Classification Search
CPC ......... H04W 36/0038; H04W 12/0401; H04W 12/04031; H04W 12/06; H04W 84/12; H04W 60/005; H04W 12/04071
(Continued)

(56) References Cited

U.S. PATENT DOCUMENTS 8,676,916 B2 * 3/2014 Bellovin ................. H04L 29/06
                                                            709/202
9,003,498 B2 * 4/2015 Aboughanaima ....... H04L 63/08
                                                            726/4
(Continued)

FOREIGN PATENT DOCUMENTS

EP    2416598 A1    2/2012
EP    3255914 A1    12/2017
WO    2011137580 A1    11/2011

OTHER PUBLICATIONS

International Search Report and Written Opinion—PCT/US2019/013392—ISA/EPO—dated Apr. 5, 2019.

*Primary Examiner* — Hai V Nguyen
(74) *Attorney, Agent, or Firm* — Loza & Loza, LLP

(57) ABSTRACT

A user device having a security context with a first network based on a first key may establish a security context with a second network. In a method, the user device may generate a key identifier based on the first key and a network identifier of the second network. The user device may forward the key identifier to the second network for forwarding to the first network by the second network to enable the first network to identify the first key at the first network. The user device may receive a key count from the second network. The key count may be associated with a second key forwarded to the second network from the first network. The user device may generate the second key based on the first key and the received key count thereby establishing a security context between the second network and the user device.

28 Claims, 10 Drawing Sheets

(51) Int. Cl.
*H04W 60/00* (2009.01)
*H04W 12/041* (2021.01)
*H04W 12/0431* (2021.01)
*H04W 12/0471* (2021.01)
*H04W 84/12* (2009.01)

(52) U.S. Cl.
CPC ....... *H04W 12/0471* (2021.01); *H04W 12/06* (2013.01); *H04W 60/005* (2013.01); *H04W 84/12* (2013.01)

(58) Field of Classification Search
USPC .......................................................... 726/21
See application file for complete search history.

(56) References Cited

U.S. PATENT DOCUMENTS

| | | | | |
|---|---|---|---|---|
| 9,084,110 | B2 * | 7/2015 | Escort | H04W 12/041 |
| 9,148,908 | B2 * | 9/2015 | Bhargava | H04W 40/12 |
| 9,276,909 | B2 * | 3/2016 | Barany | H04W 12/03 |
| 9,578,591 | B2 * | 2/2017 | Bhargava | H04W 40/12 |
| 9,623,562 | B1 * | 4/2017 | Watts | B25J 13/006 |
| 9,667,547 | B2 * | 5/2017 | Eller | H04L 12/413 |
| 9,681,339 | B2 * | 6/2017 | Chen | H04W 12/041 |
| 9,747,432 | B1 * | 8/2017 | Koller | H04W 12/37 |
| 9,794,028 | B2 * | 10/2017 | Varma | H04L 1/08 |
| 9,794,949 | B2 * | 10/2017 | Bhargava | H04W 28/22 |
| 10,075,420 | B2 * | 9/2018 | Zhu | H04W 12/041 |
| 10,251,050 | B2 * | 4/2019 | Lee | H04W 36/08 |
| 10,306,432 | B2 * | 5/2019 | Suh | H04W 12/08 |
| 10,645,564 | B2 * | 5/2020 | Lee | H04W 36/08 |
| 10,756,767 | B1 * | 8/2020 | Jacobs | H04L 25/00 |
| 10,756,795 | B2 * | 8/2020 | Black | H04W 88/085 |
| 10,841,302 | B2 * | 11/2020 | Hahn | H04L 63/0869 |
| 10,999,712 | B2 * | 5/2021 | Ta | H04W 76/14 |
| 11,063,645 | B2 * | 7/2021 | Black | H04W 4/70 |
| 11,064,355 | B2 * | 7/2021 | Bhargava | H04L 63/0209 |
| 11,070,981 | B2 * | 7/2021 | Lee | H04W 12/03 |
| 11,089,490 | B1 * | 8/2021 | Ta | H04W 24/04 |
| 11,109,438 | B2 * | 8/2021 | Kadiri | H04W 12/00 |
| 2007/0266429 | A1 * | 11/2007 | Ginter | H04L 63/20 726/12 |
| 2008/0059804 | A1 * | 3/2008 | Shah | H04L 63/0884 726/8 |
| 2008/0076392 | A1 * | 3/2008 | Khetawat | H04W 12/0431 455/411 |
| 2008/0076425 | A1 * | 3/2008 | Khetawat | H04W 12/069 455/436 |
| 2009/0138958 | A1 * | 5/2009 | Baum | H04L 12/2818 726/12 |
| 2009/0165114 | A1 * | 6/2009 | Baum | H04L 12/2809 726/12 |
| 2011/0255691 | A1 * | 10/2011 | Escort | H04W 12/041 380/247 |
| 2011/0311053 | A1 * | 12/2011 | Escott | H04L 63/06 380/272 |
| 2012/0278877 | A1 * | 11/2012 | Baum | H04L 63/20 726/12 |
| 2012/0324566 | A1 * | 12/2012 | Baum | H04M 11/04 726/12 |
| 2013/0007871 | A1 * | 1/2013 | Meenan | H04L 67/34 726/12 |
| 2013/0085815 | A1 * | 4/2013 | Onischuk | G07C 13/00 235/386 |
| 2014/0052981 | A1 * | 2/2014 | King | H04L 63/0869 713/155 |
| 2014/0059662 | A1 * | 2/2014 | Zhu | H04L 9/0841 726/6 |
| 2014/0115333 | A1 * | 4/2014 | King | H04W 12/06 713/168 |
| 2014/0115673 | A1 * | 4/2014 | Haynes | G06F 21/32 726/5 |
| 2014/0143851 | A1 * | 5/2014 | Baum | H04L 63/0209 726/12 |
| 2014/0372758 | A1 * | 12/2014 | Agiwal | H04W 12/02 713/170 |
| 2015/0043537 | A1 * | 2/2015 | Chen | H04W 12/0431 370/331 |
| 2015/0082414 | A1 * | 3/2015 | Dawes | H04L 63/0428 726/12 |
| 2015/0334087 | A1 * | 11/2015 | Dawes | H04L 63/02 726/12 |
| 2016/0057607 | A1 * | 2/2016 | Dubesset | H04W 8/04 455/433 |
| 2016/0165432 | A1 * | 6/2016 | Dubesset | H04W 76/12 455/433 |
| 2016/0337971 | A1 * | 11/2016 | Bhargava | H04W 52/0216 |
| 2017/0265108 | A1 * | 9/2017 | Chen | H04W 12/041 |
| 2018/0139309 | A1 * | 5/2018 | Pasam | H04L 69/08 |
| 2020/0092718 | A1 * | 3/2020 | Ohlsson | H04W 36/0038 |
| 2020/0245384 | A1 * | 7/2020 | Jacobs | H04W 12/00 |

* cited by examiner

METHOD AND APPARATUS FOR MULTIPLE REGISTRATIONS

CROSS-REFERENCE TO RELATED APPLICATIONS

This application claims priority to and the benefit of U.S. Provisional Patent Application No. 62/617,065, filed on Jan. 12, 2018, the entire content of which is hereby incorporated by reference.

FIELD

The present disclosure relates generally to establishing a security context between a user equipment and a wireless network infrastructure.

BACKGROUND

Wireless communication systems are widely deployed to provide various types of communication content such as, for example, voice, video, data, and so on. Typical wireless communication systems may be multiple-access systems capable of supporting communication with multiple users by sharing available system resources (e.g., bandwidth, transmission power, etc.). Generally, wireless multiple-access communication systems may simultaneously support communication for multiple devices. Each served device may communicate with one or more radio access stations.

Before accessing a wireless communication network, a device (also referred to as a subscriber device, user equipment, mobile device, etc.) may be authenticated. In many wireless communication networks, authentication may be performed using credentials provided by the network operator and/or a service provider. Thus, systems and methods for authenticating a device to a wireless communication network by exchanging one or more certificates may be beneficial.

A user equipment (UE) may be registered with two or more wireless networks of differing types. The user equipment establishes and maintains a security context with each wireless network. However, executing a full authentication of the UE every time it registers with a new serving network is time consuming.

There is therefore a need for techniques for a user equipment to efficiently establish and maintain a security context with more than one wireless network.

SUMMARY

An aspect of the present disclosure may reside in a method for establishing a security context with a second network by a user device/station having a security context with a first network based on a first key, including: generating, by the user device, a key identifier based on the first key and a network identifier of the second network; forwarding, by the user device, the key identifier to the second network for forwarding to the first network by the second network to enable the first network to identify the first key at the first network; receiving, by the user device, a key count from the second network, wherein the key count is associated with a second key forwarded to the second network from the first network; and generating, by the user device, the second key based on the first key and the received key count thereby establishing a security context between the second network and the user device.

In more detailed aspects, the user device may establish the first key with the first network when the user device registers with a third network. The first key may be established between the user device and the first network as part of the execution of an authentication and key agreement protocol with the first network. The user device may be a mobile device, the first network may a first public land mobile network, and the second network may be a second public land mobile network. Also, the second network may comprise a wireless local area network (WLAN) access network or a fixed broadband access network. The third network may comprise a 3GPP radio access network such as 5G Radio Access Network (RAN) or Long-Term Evolution (LTE) RAN.

In other more detailed aspects, the method may further comprise using, by the user device, the second key to generate at least one of an encryption key or an integrity key for protecting communications between the user device and the second network. Also, generating the key identifier may be further based on at least a portion of a user device identifier and/or a function call value.

Another aspect may reside in a user device for establishing a security context with a second network, including: means for generating a key identifier based on a first key and a network identifier of the second network, wherein a security context between the first network and the user device is based on the first key; means for forwarding the key identifier to the second network for forwarding to the first network by the second network to enable the first network to identify the first key at the first network; means for receiving a key count from the second network, wherein the key count is associated with a second key forwarded to the second network from the first network; and means for generating the second key based on the first key and the received key count thereby establishing a security context between the second network and the user device.

Another aspect may reside in a user device for establishing a security context with a second network, including: a processor configured to: generate a key identifier based on a first key and a network identifier of the second network, wherein a security context between the first network and the user device is based on the first key; forward the key identifier to the second network for forwarding to the first network by the second network to enable the first network to identify the first key at the first network; receive a key count from the second network, wherein the key count is associated with a second key forwarded to the second network from the first network; and generate the second key based on the first key and the received key count thereby establishing a security context between the second network and the user device.

Another aspect of may reside in a computer-readable medium, including: code for causing a computer to generate a key identifier based on a first key and a network identifier of the second network, wherein a security context between the first network and the user device is based on the first key; code for causing the computer to forward the key identifier to the second network for forwarding to the first network by the second network to enable the first network to identify the first key at the first network; code for causing the computer to receive a key count from the second network, wherein the key count is associated with a second key forwarded to the second network from the first network; and code for causing the computer to generate the second key based on the first key and the received key count thereby establishing a security context between the computer.

Yet another aspect may reside in a method, including: receiving, by a first network, a key identifier, wherein the key identifier is based on a first key and a network identifier of a second network; identifying, by the first network, the first key based on the key identifier and the network identifier of the second network; generating, by the first network, a second key based on the first key and a key count; and forwarding, by the first network, the second key and the key count to the second network for establishing a security context between the second network and a user device.

Another aspect may reside in a first network, including: means for receiving a key identifier, wherein the key identifier is based on a first key and a network identifier of a second network; means for identifying the first key based on the key identifier and the network identifier of the second network; means for generating a second key based on the first key and a key count; and means for forwarding the second key and the key count to the second network for establishing a security context between the second network and a user device.

Another aspect may reside in a first network, including: a processor configured to: receive a key identifier, wherein the key identifier is based on a first key and a network identifier of a second network; identify the first key based on the key identifier and the network identifier of the second network; generate a second key based on the first key and a key count; and forward the second key and the key count to the second network for establishing a security context between the second network and a user device.

Another aspect may reside in a computer-readable medium, including: code for causing a computer to receive a key identifier, wherein the key identifier is based on a first key and a network identifier of a second network; code for causing the computer to identify the first key based on the key identifier and the network identifier of the second network; code for causing the computer to generate a second key based on the first key and a key count; and code for causing the computer to forward the second key and the key count to the second network for establishing a security context between the second network and a user device.

An aspect may reside in a method for establishing a security context with a second network by a user device having a security context with a first network based on a first key, including: generating, by the user device, a key identifier based on the first key and at least a portion of a user device identifier; forwarding, by the user device, the key identifier to the second network for forwarding to the first network by the second network to enable the first network to identify the first key at the first network; receiving, by the user device, a key count from the second network, wherein the key count is associated with a second key forwarded to the second network from the first network; and generating, by the user device, the second key based on the first key and the received key count thereby establishing a security context between the second network and the user device.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures, and techniques may not be shown in detail in order not to obscure the embodiments. The word "exemplary" is used herein to mean "serving as an example, instance, or illustration." Any embodiment described herein as "exemplary" is not necessarily to be construed as preferred or advantageous over other embodiments.

Figure 1:
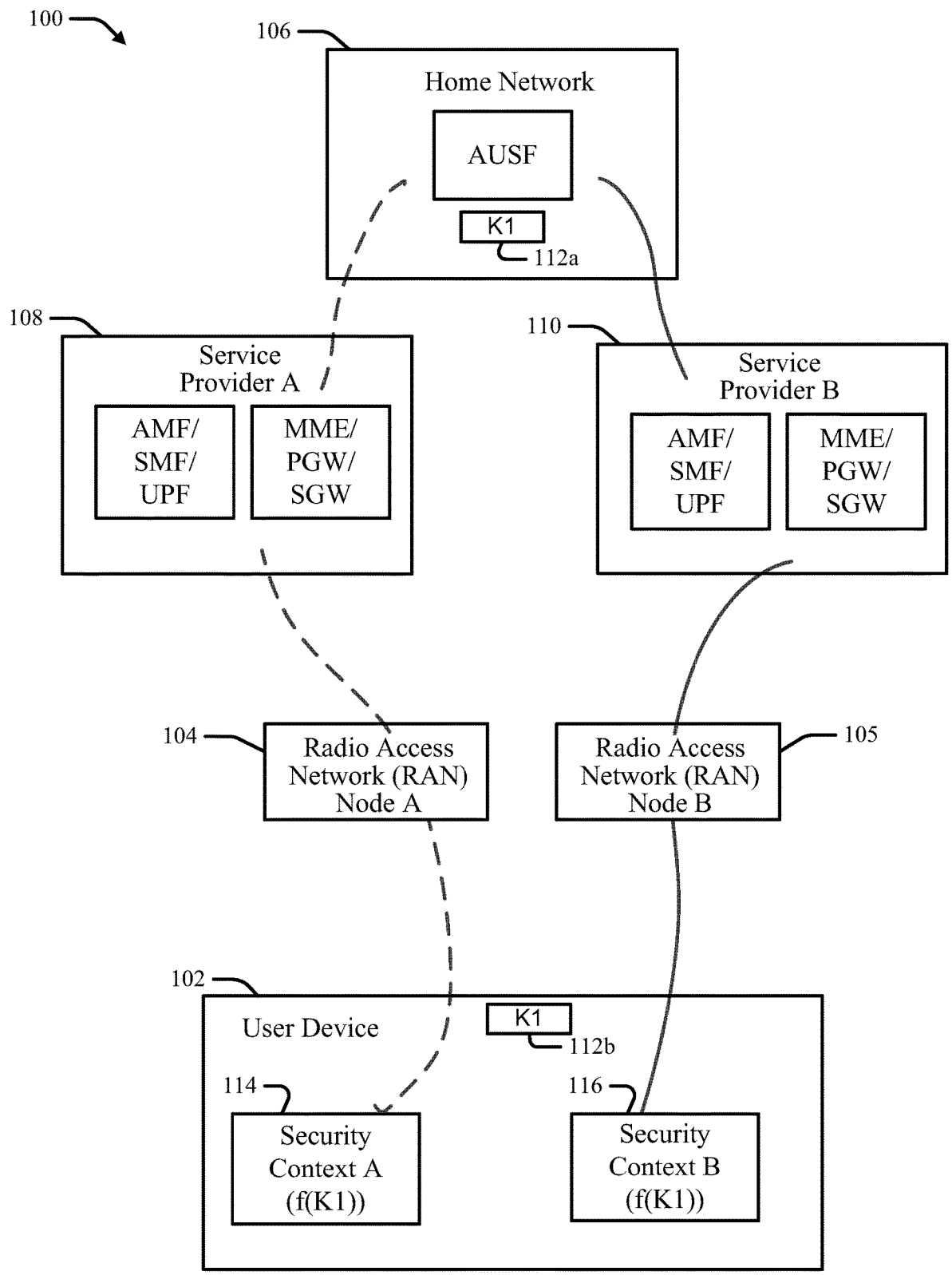
FIG. 1 is a block diagram illustrating an exemplary wireless network system in which a user equipment may perform multiple network registrations with multiple serving networks while avoiding a primary authentication.

FIG. 1 is a block diagram illustrating an exemplary wireless network system in which a user equipment may perform multiple network registrations with multiple serving networks while avoiding a primary authentication. In this wireless network system 100, a user device 102 (e.g., a subscriber device, a mobile phone, a wearable device, a communication device incorporated into a vehicle, a user equipment, etc.) may communicate over a first radio access network A (RAN) 104 through a first service provider A (e.g., first serving network) 108 to a home network 106 that serves to authenticate the user device 102 and agree on one or more keys with the user device 102. As part of this authentication and key agreement (AKA) process between the home network 106 and the user device 102, a first key K1 112a and 112b is generated that is known to the home network 106 and the user device 102. This first key K1 (or another key derived from K1) is then used to generate a first security context A 114 which serves to secure communications to/from the user device 102 and/or generate additional keys at the user device 102. The first security context A 114 may be generated at both the user device 102 and at the first service provider A 108.

Subsequently, if the user device 102 may seek to communicate over a second service provider B 110 (e.g., second serving network) via a second radio access network B 105. Consequently, it may attempt to register with the second service provider 110 to establish a security context with the second service provider B (e.g., second serving network)

110. Rather than performing another AKA process with the home network 106 (which is time consuming), the first key K1 may be reused to establish a second security context B 116 with the second network B 110. The second security context B 116 may be generated at both the user device 102 and at the second service provider B 110.

Note that while two RANs 104 and 105 are illustrated to serve the service providers A 108 and B 110 (i.e., serving networks) in FIG. 1, it is contemplated that in other implementations, both service provider A 108 and/or B 110 may be coupled to a single radio access network.

Figure 2A:
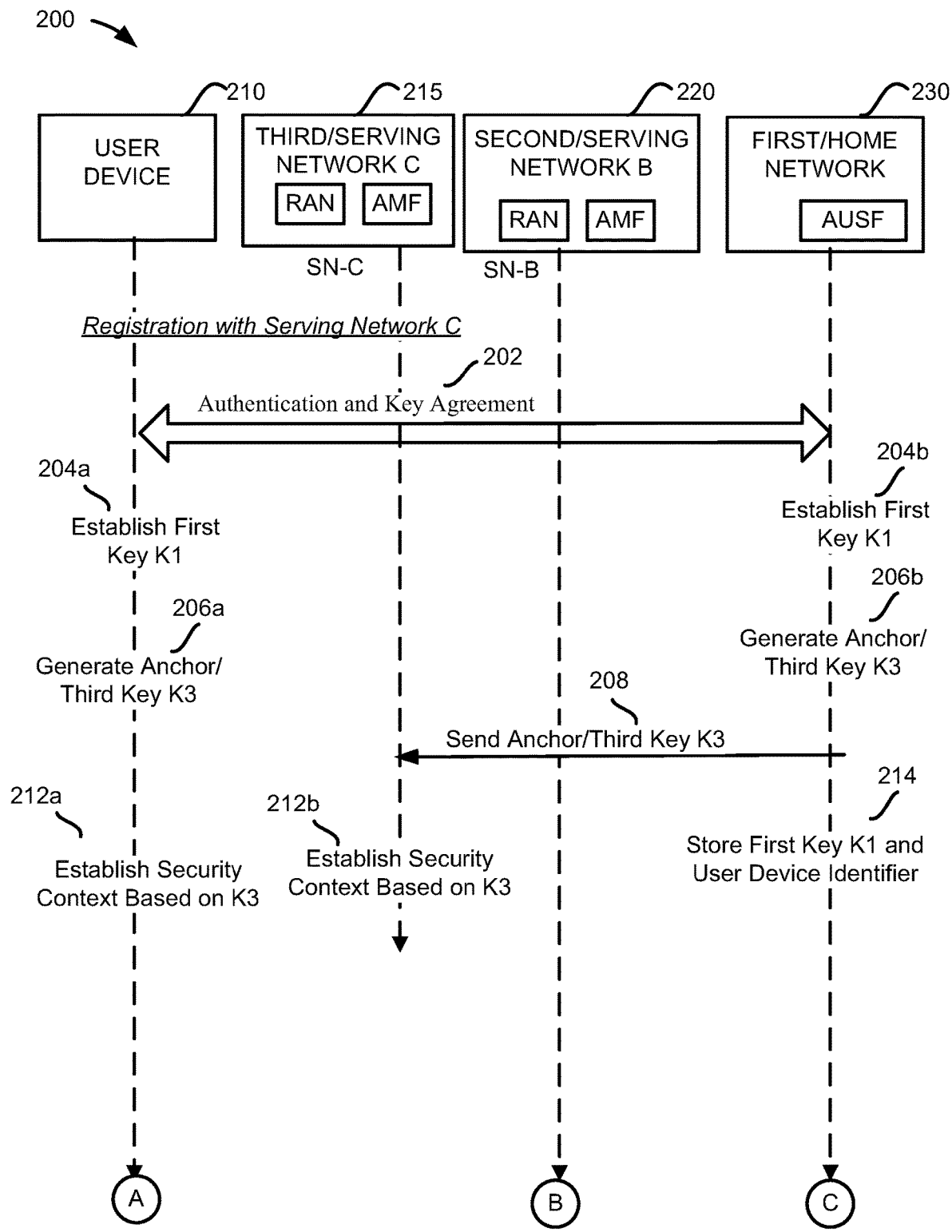
FIGS. 2A and 2B illustrate flow diagrams of an exemplary authentication and registration process for establishing a security context for a user device communicating over one or more networks, according to one feature.
Figure 2B:
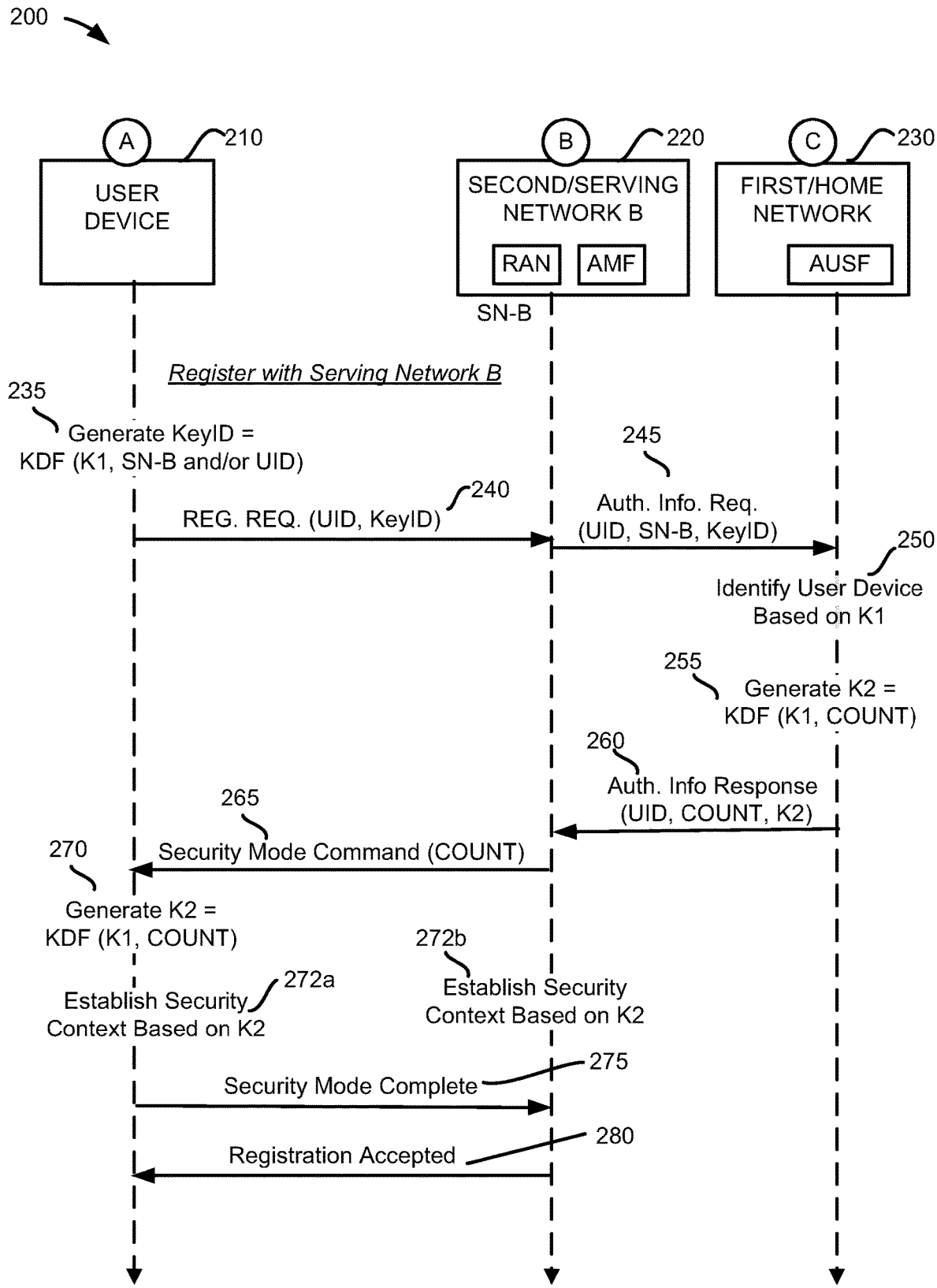

FIGS. 2A and 2B illustrate flow diagrams of an exemplary authentication and registration process 200 for reusing a security key to establish another security context for a user device 210 communicating over one or more networks. In one example, the user device 210 may initially obtain service via a third (serving) network 215. In order to communicate through the third network 215, the user device 210 may establish a first key K1 with a home network 230 when the user device 210 registers with the third network 215 (e.g., a radio access network). In various examples, the user device 210 may be a mobile station, a subscriber device, a wearable device, a communication device incorporated in a vehicle, a client device, a mobile device, a wireless device, etc. The home network 230 may be a public land mobile network (PLMN) and may comprise a 3GPP radio access network such as 5G RAN or LTE RAN. In some instances, the home network (e.g., also referred to as an authentication network, an authorizing network, etc.) Similarly, the third network 215 may be a first public land mobile network, and may comprise a wireless local access network (WLAN) and/or a fixed broadband access network.

As part of the execution of an authentication and key agreement (AKA) protocol 202 between the user device 210 and the home network 230, the home network 230 may authenticate the user device 210 (e.g., based on a unique device identifier) and at least one key may be established at the home network 230 and user device 210. For instance, upon successful authentication of the user device, a first key K1 may be established 204 at the user device 210 and the home network 230. This first key K1 may be generated based on, for example, information exchanged in the AKA 202, a secret user device key, a unique user device identifier, etc. This first key K1 may be used to generate a third key K3 (e.g., an anchor key) 206b at the home network 230. This third key K3 may be sent 208 by the home network 230 to the third network 215. Note that, the first key K1 may be known only to the user device 210 and the first (home) network 230, but is unknown to the third network 215. The third network 215 may then generate and/or establish a first security context 212b, for the user device 210, as a function of the third key K3 (e.g., an anchor key $K1_{SEAF}$). It is contemplated that various methods may be used to establish the first key K1, which may also be associated with a unique user device identifier (UID) at the home network 230. Additionally, it is also contemplated that various methods may be used to generate or establish the third key K3, where the user device 210 may be aware of the methods (e.g., key derivation function) used by the home network 230 and the third network 215.

Similarly, upon receiving a successful authentication message/indication from the home network 230, the user device may establish a local instance of the first key K1 204a (e.g., using the same key derivation function as the home network 230) and then may generate a local instance of the third key K3 206a (e.g., using the same key derivation function as the third network 215). The user device may then use its local version of the third key K3 to establish a security context 212a with the third network 215.

Note that since the third key K3 is derived as a function of the first key K1, it can also be said that the security context 212a and 212b is established as a function of the first key K1.

At a subsequent time, the user device 210 may use a second (serving) network 220 for communications. That is, the user device 210 may switch to using the second network 220 or it may use the second network 220 concurrently with the third network 215. The second network 220 may be a second public land mobile network and may comprise a wireless local access network (WLAN) or a fixed broadband access network.

Instead of again executing the AKA protocol through the second network 220, the user device 210 may reuse the first key K1 to establish a second security context with the second network 220. The user device 210 may use a key derivation function (KDF) to generate a key identifier KeyID 235 based on the first key K1, a second network identifier or network name SN-B of the second network 220, and/or the unique user device identifier (UID). In this manner, the first key K1 may be utilized as a basis to establish multiple security contexts (e.g., first security context 212 and second security context 272) with at least two distinct serving networks.

The user device 210 may forward the key identifier KeyID, as part of a registration request 240, to the second network 220. The second network 220 may then send an authentication request 245, including the second network identifier/name SN-B and the unique user device identifier UID, to the home network 230. The home network 230 may then identify the user device 210 based on the first key K1. That is, the unique user device identifier UID, the home network 230 is able to ascertain the first key K1. The home network 230 is thus able to authenticate the user device 210 without executing the AKA protocol again.

The home network 230 may generate a second key K2 255 as a function of the first key K1 and a key count COUNT. The home network 230 may then forward 260 the second key K2 to the second network 220 (e.g., as part of an authentication response that also includes the unique user device identifier UID and the key count COUNT). In turn, the second network 220 may send 265 the key count COUNT to the user device 210 (e.g., as part of a security mode command) Having received the second key K2, the second network 220 is then able to generate/establish a second security context 272b, with the user device 210, based on the second key K2. Likewise, the user device 210 may also generate a local instance of the second key K2 270 based on the first key K1 and the received key count COUNT. The user device 210 may then use its local instance of the second key K2 to establish the second security context 272a with the second network 220.

Figure 3:
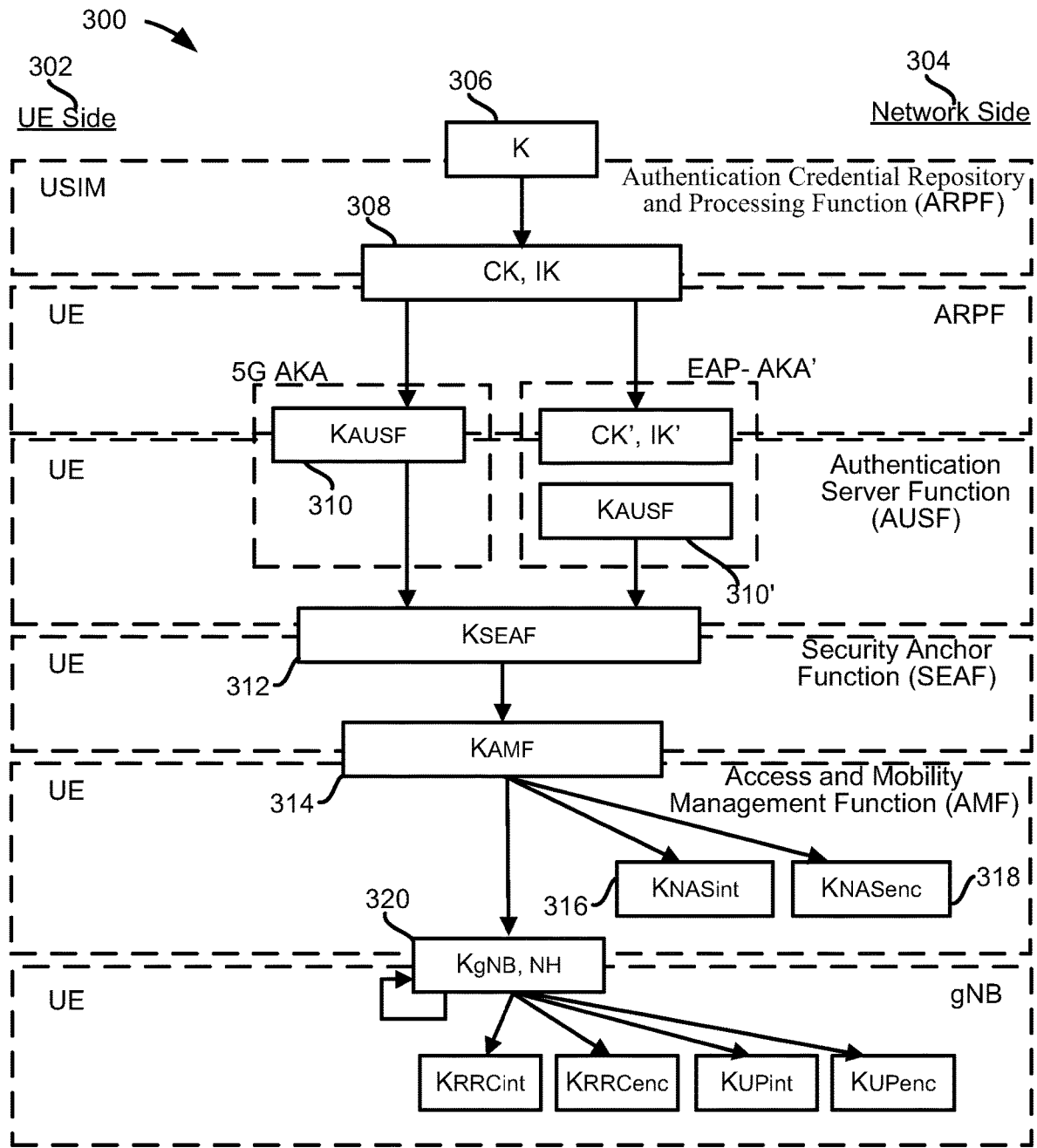
FIG. 3 is a diagram illustrating an exemplary key hierarchy structure for a 5G communication system.

FIG. 3 is a diagram illustrating an exemplary key hierarchy structure for a 5G communication system. This exemplary key hierarchy structure 300 may serve to generate various keys to establish and secure communications between a user device (UE) 302 and a network 304. A long term secret key (K) 306 may be provisioned in a universal subscriber identification module (USIM) for the user device 302. The user device 302 and network 304 may generate a ciphering key (CK) and integrity key (IK) 308 as a function of the secret key K 306.

A first authentication key $K_{AUSF}$ 310 is derived by the user device and network (e.g., Authentication Credential Repository and Processing Function or ARPF) from the ciphering key CK and integrity key IK 308 during an Authentication and Key Agreement (AKA) process. If the 3GPP secret key K is used for authentication over a radio access technology supporting the extensible authentication protocol EAP, the first authentication key $K_{AUSF}$ 310' is derived according to the EAP AKA' specification.

After a successful primary authentication between the user device 302 and the network 304, a serving network specific anchor key ($K_{SEAF}$) 312 may be derived from the first authentication key $K_{AUSF}$ 310

From the anchor key $K_{SEAF}$ 312, confidentiality and integrity protection keys are derived for NAS signaling and the access stratum (AS) consisting of control plane (CP), i.e., radio resource control (RRC) messages, and user plane (UP). For instance, the anchor key $K_{SEAF}$ 312 may be used to derive an access and mobility key $K_{AMF}$ 314 by the user device and a security anchor function (SEAF). The access and mobility function (AMF) may generate a confidential integrity key $K_{NASint}$ 316 and a confidential encryption key $K_{NASenc}$ 318 from the access and mobility key $K_{AMF}$ for Non-Access Stratum (NAS) signaling protection. A security context may include the confidential integrity key $K_{NASint}$ 316 and the confidential encryption key $K_{NASenc}$ 318.

The user device 312 and the AMF may also generate a node key $K_{gNB}$ 320 from the access and mobility key $K_{AMF}$ 314. Integrity and confidentiality keys for AS, i.e. UP ($K_{UPint}$ and $K_{UPenc}$) and RRC ($K_{RRCint}$ and $K_{RRCenc}$), may be derived from the node key $K_{gNB}$. An intermediate key NH may also be derived to provide forward secrecy during handover.

Referring again to FIG. 2, the first key K1 may be equivalent to the first authentication key $K_{AUSF}$ 310 or 310' in the key hierarchy 300 of FIG. 3. A first anchor key $K1_{SEAF}$ may then be generated from the first key K1. For instance, referring to FIG. 2, after establishing the first key K1 204a and 204b (e.g. at the user device 210 and the AUSF of the home network 230), a first anchor key $K1_{SEAF}$ may be generated as a function of the first key K1 (e.g., first authentication key $K_{AUSF}$ 310 or 310' FIG. 3) at the user device 210 and the AUSF (at the home network 230). The AUSF at the home network 230 may then send the first anchor key $K1_{SEAF}$ to the third network 215.

Subsequently, if/when a second registration is performed by the user device 210 with a second network, rather than performing another primary authentication (which is time consuming), the first key K1 (e.g., authentication key $K_{AUSF}$ 310 or 310') may be used to authenticate the user device and generate a second anchor key $K2_{SEAF}$. Thus, subsequent registrations of the user device with other serving networks may utilize the first key K1 (e.g., authentication key $K_{AUSF}$ 310 or 310') to avoid a primary authentication and to generate additional anchor keys. For instance, referring to FIG. 2, after identifying the user device using the first key K1 250, a second key K2 255 (e.g., second anchor key $K2_{SEAF}$) is generated by the AUSF of the home network 230. This second key K2 (e.g., second anchor key $K2_{SEAF}$) is then sent 260 to the second network 220 by the AUSF of the home network 230. Additionally, after receiving the key count COUNT 265, the user device 210 also generates a local version of the second key K2 270. Both the user device 210 and the second network 220 may then establish a second security context 272a and 272b based on the second key K2 (e.g., second anchor key $K2_{SEAF}$).

Figure 4:
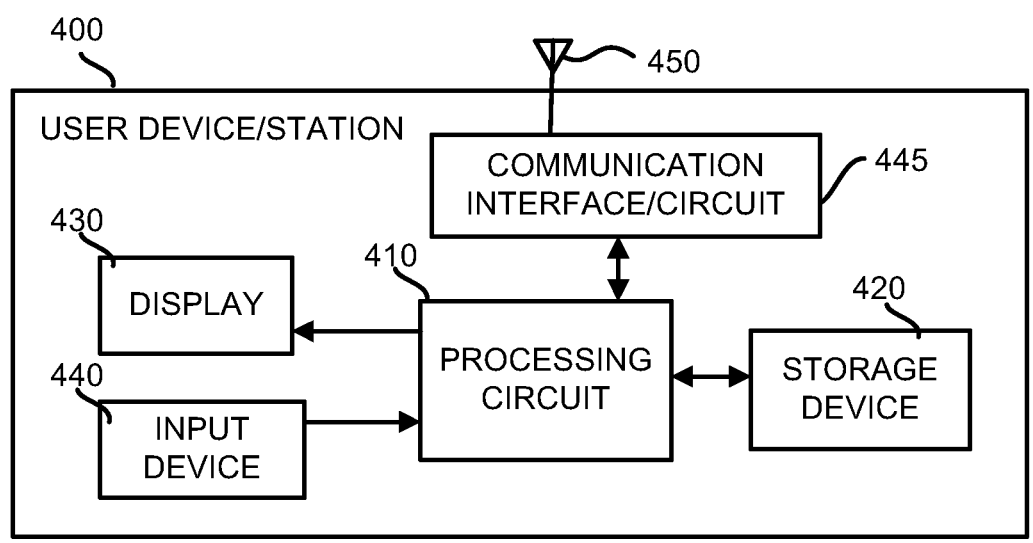
FIG. 4 is a block diagram of an exemplary user device configured to perform multiple registrations and establishing multiple security contexts.

FIG. 4 is a block diagram of an exemplary user device configured to perform multiple registrations and establishing multiple security contexts. The user device 400 may comprise a processing circuit 410 coupled to a storage device/ medium 420 (e.g., a memory and/or a disk drive), a display 430, an input device 440 (e.g., a keypad, a microphone, etc.), and/or a communication interface/circuit 445 coupled to one or more wireless antennas 450.

In a typical device registration, a user device may be registered in a first serving network over a certain type of access (e.g. 3GPP) and may be registered with a second serving network over another type of access (e.g. non-3GPP). In such cases, the user device may independently maintain and use two different (5G) security contexts, one per serving network (i.e., one per PLMN network).

Instead of performing a separate primary authentication (e.g., 5G AKA or EAP-AKA') with a second serving network when the user device is already registered via a first serving network, the user device 400 may be configured to reuse a first key, previously established with the first serving network, to bypass/avoid performing primary authentication again for the second serving network. During the primary authentication for the first serving network, a first key K1 has been generated and stored at the authentication server function (AUSF) for the home network for the user device 400. For instance, this first key K1 may be known as the first authentication key $K_{AUSF}$ (310 or 310' in FIG. 3). The first key K1 may be used to create security contexts at the second serving network without having to perform yet another primary authentication via the second serving network.

A key identifier KeyID may be derived from the first authentication key $K_{AUSF}$ by incorporating the serving network identifier/name SN-B of the second serving network and using it to: a) negotiate the use of the optional feature (i.e., reuse of the first key K1 to avoid a separate primary authentication execution) between the user device 400 and the home network, and b) identify the context at the AUSF of the home network to establish the security contexts. More specifically, if the user device 400 has previously registered in a first serving network and wants to register with a different second serving network and has the stored first authentication key $K_{AUSF}$ available, it may derive a key identifier KeyID_AUSF from the first authentication key $K_{AUSF}$ and may include it in a Registration Request (240 in FIG. 2). The user device 400 may include the serving network identifier/name of the serving network (PLMN) in the key identifier KeyID_AUSF derivation.

In one example, the KeyID (or KeyID_AUSF) may be derived as follows:

$$KeyID\_AUSF = KDF (K\_AUSF, SN\text{-}ID, FC \text{ value for KeyID derivation}),$$

where KeyID_AUSF may be identified with a fixed (e.g., 32) least significant bits of the output of a key derivation function (KDF), such as the SHA-256 (which may have an output of 256 bits). The K_AUSF may be 256 bits long. The serving network identifier/name SN-ID may be the serving network identifier/name (e.g., second network identifier SN-B) and may be equal to a concatenation of a service code set to '5G' and a visiting PLMN (VPLMN ID) according to standards for construction of a serving network identifier/name.

The user device 400 may forward the KeyID_AUSF and a user device identifier (UID) to the Access and Mobility Management Function (AMF) in a Registration Request (240 in FIG. 2). In various examples, the UID may be a subscription concealed identifier (SUCI) or a subscription permanent identifier (SUPI). Upon receiving the Registration Request with the KeyID_AUSF, a security anchor function (SEAF), which may be within the AMF, may include the KeyID_AUSF in an Authentication Initiation Request (5G-AIR) message (245 in FIG. 2) to the AUSF.

In an alternate embodiment, the user device identifier (UID) or a portion of the UID (e.g., 32 least significant bits of the UID) may be included as an input to the KDF to derive the KeyID instead of the network identifier/name SN-ID. For example, the KeyID may be derived as KeyID_AUSF=KDF (K_AUSF, UID, FC value for KeyID derivation), where UID is included in its entirety or an arbitrary portion of it (e.g., 32 least significant bits of UID). When the UID is a privacy preserving subscription identifier, such as the SUCI, the inclusion of at least a portion of the UID ensures that the generated key identifier preserves privacy of the subscriber identifier. In yet another embodiment, the UID or part of the UID may be included as the input to the KDF in addition to the SN-ID.

Upon receiving the Authentication Initiation Request message (245 in FIG. 2), if the AUSF (for the home network) has the stored the K_AUSF (i.e., first authentication key $K_{AUSF}$) it may decide to reuse it. If it decides to reuse it, then the AUSF may derive the KeyID_AUSF in the same way as the user device 400, and verifies whether the KeyID_AUSF derived by the AUSF matches the received value. If they match, then the AUSF may skip the authentication and may derive the K_SEAF (i.e., second key K2 in FIG. 2) from the K_AUSF (e.g., first key K1 in FIG. 2) and a counter AUSF_KDF_COUNT. A key derivation function KDF, such as SHA-256, may be used to derive the K_SEAF (e.g., second key K2 in FIG. 2). The AUSF_KDF_COUNT (e.g., COUNT in FIG. 2) may be a monotonically increasing 32-bit counter, with the initial value of zero. After each key derivation from the K_AUSF, the AUSF increments AUSF_KDF_COUNT by 1. The AUSF_KDF_COUNT may be stored by the AUSF along with the K_AUSF. The use of AUSF_KDF_COUNT ensures that a key derived from K_AUSF is always fresh.

The AUSF (for the home network) may send the derived K_SEAF (e.g., second key K2 in FIG. 2), along with the AUSF_KDF_COUNT, to the SEAF in Authentication Initiation Answer (5G-AIA) (260 in FIG. 2). The AMF may use the K_SEAF to establish a separate 5G security context with the user device 400 by sending a Network Access Stratum (NAS) Security Mode Command (SMC) to the user device 400. The NAS SMC may include the AUSF_KDF_INPUT. The AUSF_KDF_INPUT in the NAS SMC may be integrity protected but not ciphered. The user device 400 shall use the AUSF_KDF_COUNT received in the NAS SMC to derive the K_SEAF (second key K2 in FIG. 2) and to establish a separate 5G security context with the AMF in the second serving network.

The user device 400 may send an NAS Security Mode Complete command (275 in FIG. 2) to the AMF. The AMF (second serving network) may respond with a accept message (280 in FIG. 2).

Otherwise, if the AUSF of the home network does not support the storage of the K_AUSF or the AUSF wants to perform primary authentication of the user device 400, the AUSF may initiate a primary authentication by sending Auth-Info-Req message to the UDM/ARPF. A successful authentication of the UE results in establishment of a separate 5G security context with the AMF.

Various examples of the user device 400 may include a handheld phone, a subscriber device, a user equipment (UE), a wearable computing device, a communication device incorporated in a vehicle, and/or a laptop computer. The communication interface/circuit 445 for the user device 400 may support any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Figure 5:
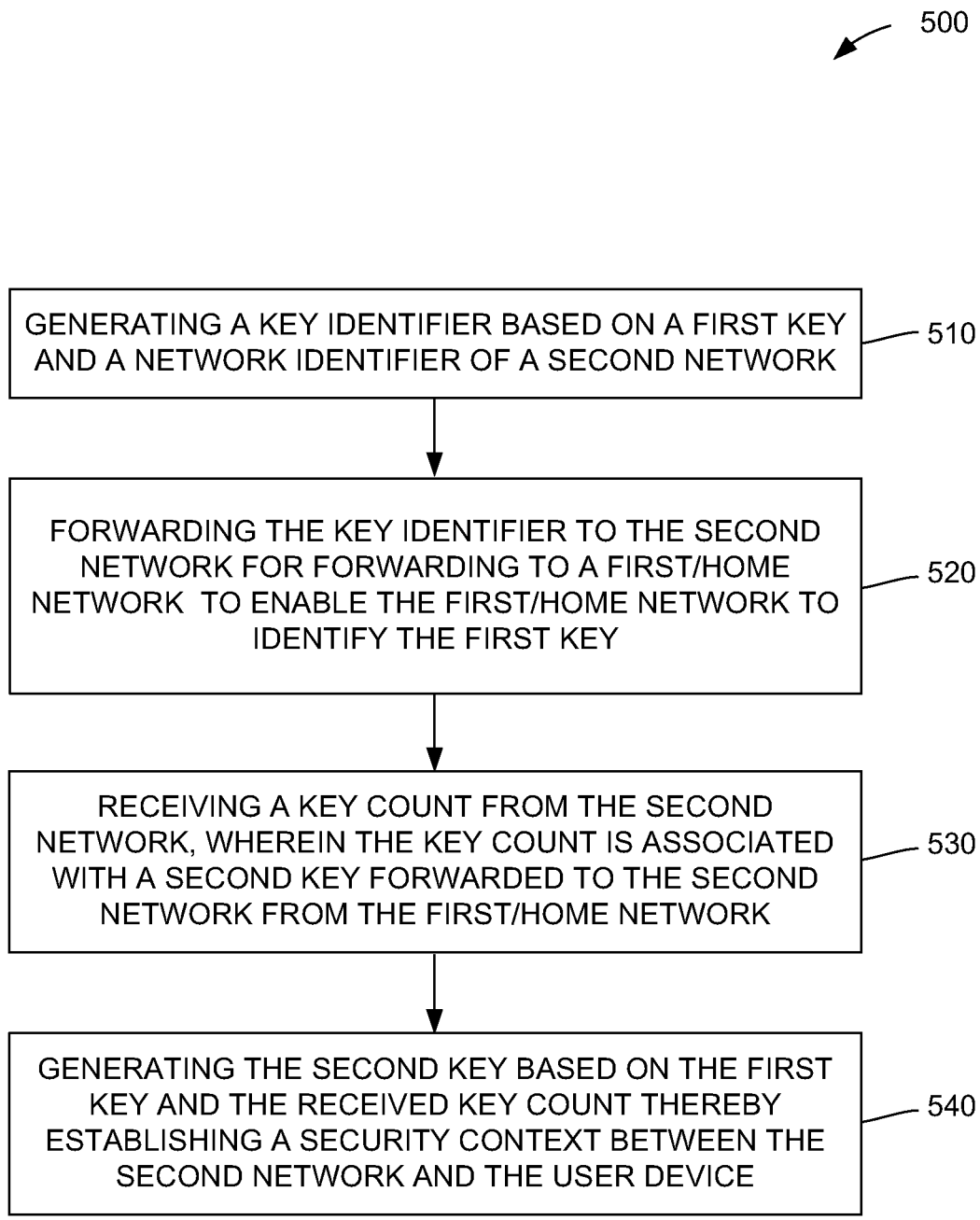
FIG. 5 is a flow diagram of a method for establishing a security context between a user device and a second network, according to one exemplary feature.

FIG. 5 is a flow diagram of a method, operational at a user device, for establishing a security context between the user device and a second network, according to one exemplary feature. In one example, this method may be implemented by the user device 400 of FIG. 4. A key identifier KeyID may be generated 510 based on a first key K1 (previously established for a first network) and a network identifier/name of the second network (235 FIG. 2), wherein a security context between the first network and the user device 400 is based on the first key K1. The key identifier KeyID may be forwarded/sent 520 to the second network for forwarding to a home network to enable the home network to identify the first key K1 (250 FIG. 2). A key count COUNT may be received 530 from the second network (265 FIG. 2), wherein the key count is associated with a second key K2 forwarded to the second network from the home network. At the user device, the second key K2 may be generated 540 based on the first key K1 and the received key count thereby establishing a security context between the second network and the user device 400 (270 and 272 in FIG. 2).

Referring again to FIG. 4, according to one aspect, the user device 400 may be configured to establish a security context with a second network 220 (FIG. 2), comprising: means (e.g., processing circuit 410 and/or communication interface/circuit 445) for generating a key identifier KeyID based on a first key K1 (e.g., first authentication key $K_{AUSF}$) and a second network identifier/name SN-B, wherein a first security context between a third network 215 and the user device 400 has been previously established based on the first key K1; means (e.g., processing circuit 410 and/or communication interface/circuit 445) for forwarding (240 in FIG. 2) the key identifier KeyID to the second network for forwarding to a home network to enable the home network to identify the first key K1 (i.e., to ascertain whether the first key K1 has been previously used by the user device); means (e.g., processing circuit 410 and/or communication interface/circuit 445) for receiving a key count COUNT from the second network (265 in FIG. 2), wherein the key count is associated with the second key K2 forwarded to the second network from the home network; and means (e.g., processing circuit 410) for generating the second key K2 based on the first key K1 and the received key count COUNT thereby establishing a security context between the second network and the user device (272 in FIG. 2).

Another aspect may provide computer-readable medium or storage device 420, comprising: code for causing the processing circuit 410 to generate a key identifier KeyID based on a first key K1 (previously established through a first serving network) and a network identifier/name of a second serving network (235 in FIG. 2 or 510 in FIG. 5), wherein a first security context between the first serving network and the user device 400 is based on the first key K1; code for causing the processing circuit 410 to forward (240 in FIG. 2 or 520 in FIG. 5) the key identifier KeyID to the second serving network for forwarding to the home network to enable the home network to identify the first key K1 at the home network; code for causing the processing circuit 410 to receive a key count COUNT from the second network, wherein the key count is associated with a second key K2 forwarded to the second network from the home network (265 in FIG. 2 or 530 in FIG. 5); and code for causing the processing circuit 410 to generate the second key K2 based on the first key K1 and the received key count thereby establishing a security context (i.e., second security context) between the second network and the user device 400 (272 in FIG. 2 or 540 in FIG. 5).

Figure 6:
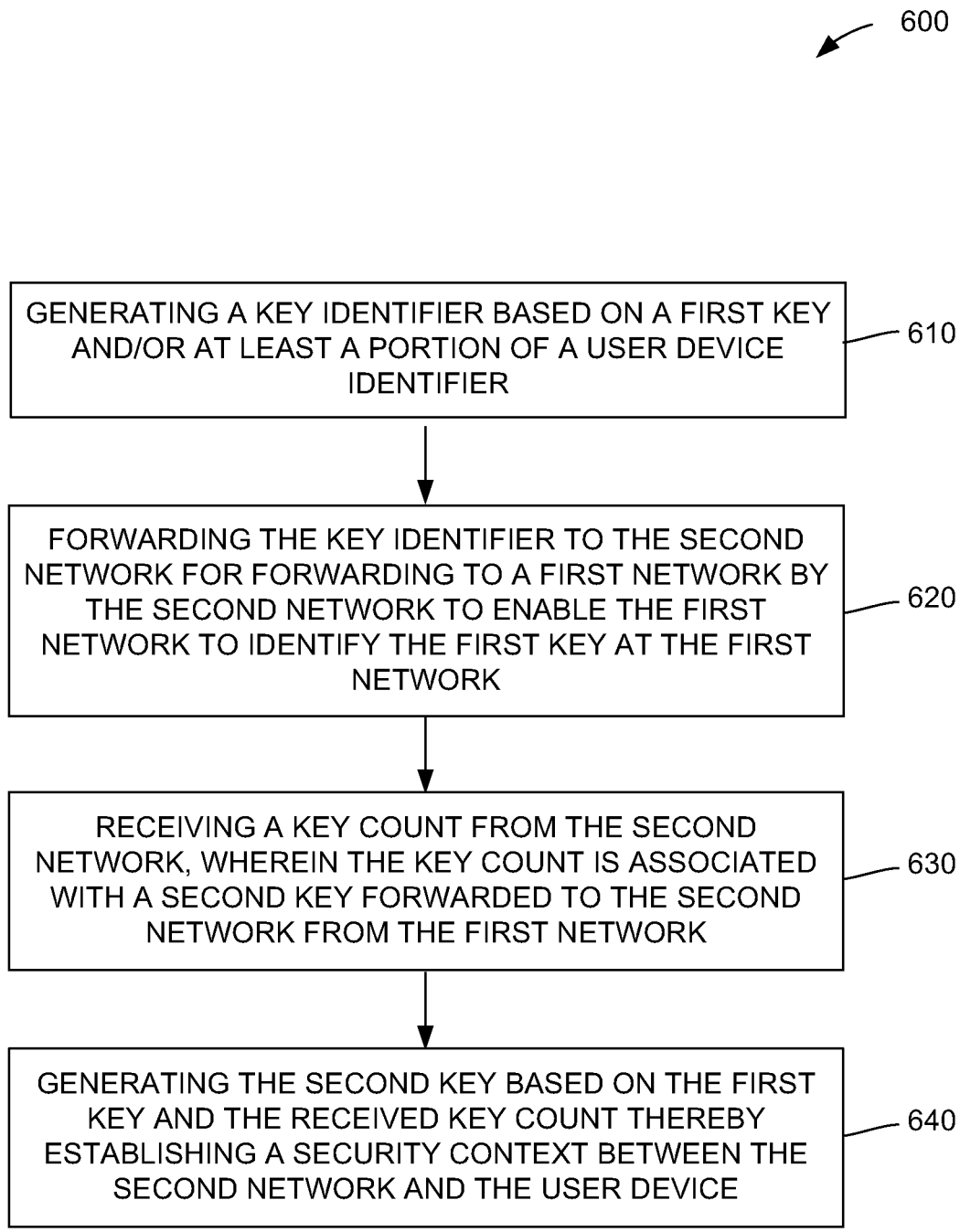
FIG. 6 is a flow diagram of another exemplary method operational on a user device for facilitating efficient security context generation by identifying a first key and providing a key count for establishing another security context, according to one aspect.

FIG. 6 is a flow diagram of another exemplary method 800 operational on a user device for facilitating efficient security context generation by identifying a first key and providing a key count for establishing another security context, according to one aspect. This method 600 may be performed, for instance, by the user device 400. A first key K1 may have been previously established (e.g., as part of an AKA procedure) between the user device and a first (home) network. Subsequently, when the user device wishes to establish communications over a different second serving network, the user device may generate a key identifier KeyID 610 based on the first key and at least a portion of a user device identifier UID (235 in FIG. 2). The user device may forward the key identifier 620 to the second network for forwarding to the first (home) network to enable the home network to identify the first key at the home network (steps 240). The user device may receive a key count COUNT 630 from the second network (265 in FIG. 2). The key count may be associated with a second key K2 forwarded to the second network from the first (home) network. The user device may generate the second key 640 based on the first key and the received key count thereby establishing a security context between the second network and the user device (270 in FIG. 2).

Figure 7:
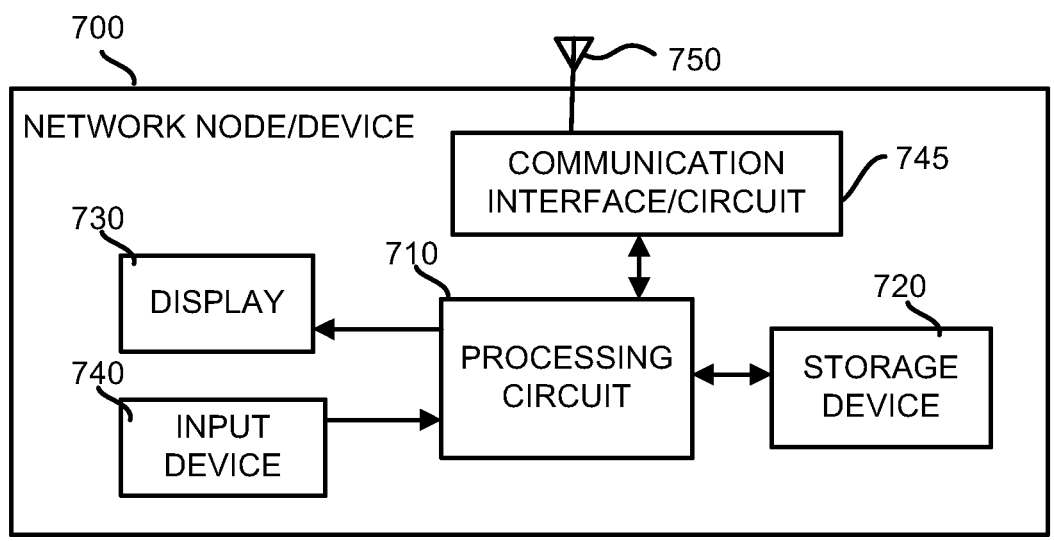
FIG. 7 is a block diagram of an exemplary network node/device configured to provide services to one or more user devices.

FIG. 7 is a block diagram of an exemplary network node/device configured to provide services to one or more user devices. The network node/device 700 may comprise a processing circuit 710 coupled to a storage device/medium 720 (e.g., a memory and/or a disk drive), a display 730, an input device 740 (e.g., a keypad, a microphone, etc.), and/or a communication interface/circuit 745 coupled to one or more wireless antennas 750 and/or networks. In various examples, the network node/device 700 may be the third network 215, the second network 220, and/or the first/home network 230 in FIG. 2, and/or may be configured to perform one or more functions performed by these networks. For instance, the network node/device 700 may be configured to perform multiple registrations and establishing multiple security contexts for one or more user devices.

Figure 8:
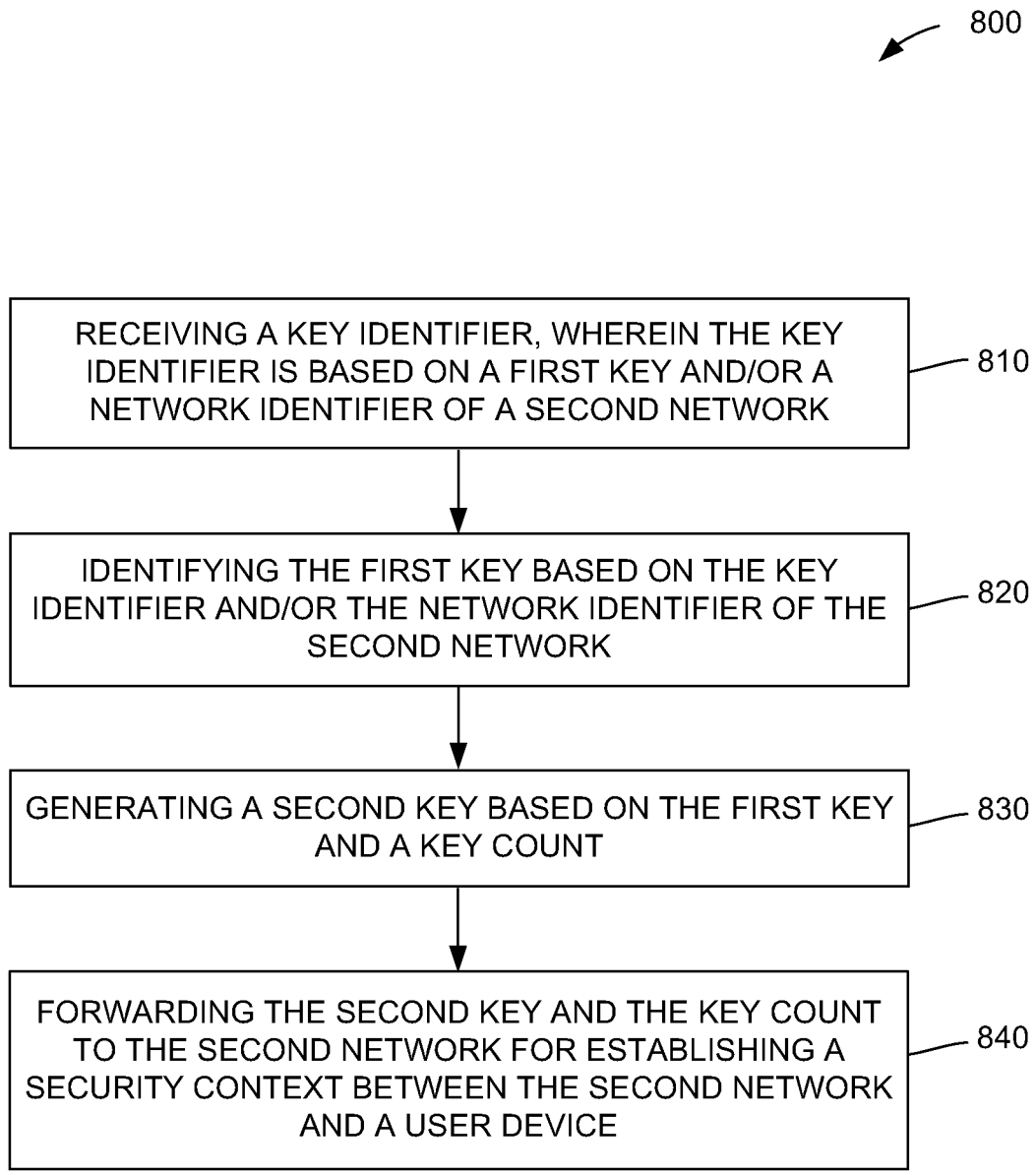
FIG. 8 is a flow diagram of an exemplary method operational on a home network device for facilitating efficient security context generation by identifying a first key and providing a key count for establishing another security context, according to one aspect.

FIG. 8 is a flow diagram of an exemplary method 800 operational on a first (home) network for facilitating efficient security context generation by identifying a first key and providing a key count for establishing another security context, according to one aspect. This method 800 may be performed, for instance, by a home network node/device (230 in FIG. 2). A key identifier KeyID may be received 810, wherein the key identifier is based on a first key K1 and a network identifier/name SN-B of a second network. The first key may be identified 820 based on the key identifier and the network identifier/name of the second network. That is, the home network node/device may ascertain that the first key has been previously established by a sending user device but for a different serving network. A second key K2 is then generated 830 based on the first key and a key count COUNT. The second key and the key count are then forwarded 840 to the second network for establishing a security context between the second network and a user device.

Referring again to FIG. 7, another aspect may be implemented by the network node/device 700, comprising: means (e.g., processing circuit 710 and/or communication interface/circuit 745) for receiving a key identifier KeyID, wherein the key identifier is based on a first key K1 and a network identifier/name SN-B of a second network; means (e.g., processing circuit 710) for identifying the first key based on the key identifier and the network identifier/name of the second network; means (e.g., processing circuit 710) for generating a second key K2 based on the first key and a key count COUNT; and means (e.g., processing circuit 710 and/or communication interface/circuit 745) for forwarding the second key and the key count to the second network for establishing a security context between the second network and a user device.

Another aspect may reside in the computer-readable medium or storage device 620, comprising: code for causing the processing circuit 710 to receive a key identifier keyID, wherein the key identifier is based on a first key K1 and a network identifier/name SN-B of a second network (245 in FIG. 2 or 810 in FIG. 8); code for causing the processing circuit 710 to identify the first key based on the key identifier and the network identifier/name of the second network (250 in FIG. 2 or 820 in FIG. 8); code for causing the processing circuit 710 to generate a second key K2 based on the first key and a key count COUNT (255 in FIG. 2 or 830 in FIG. 8); and code for causing the processing circuit 710 to forward the second key and the key count to the second network for establishing a security context between the second network and a user device (260 FIG. 2 or 840 in FIG. 8).

Figure 9:
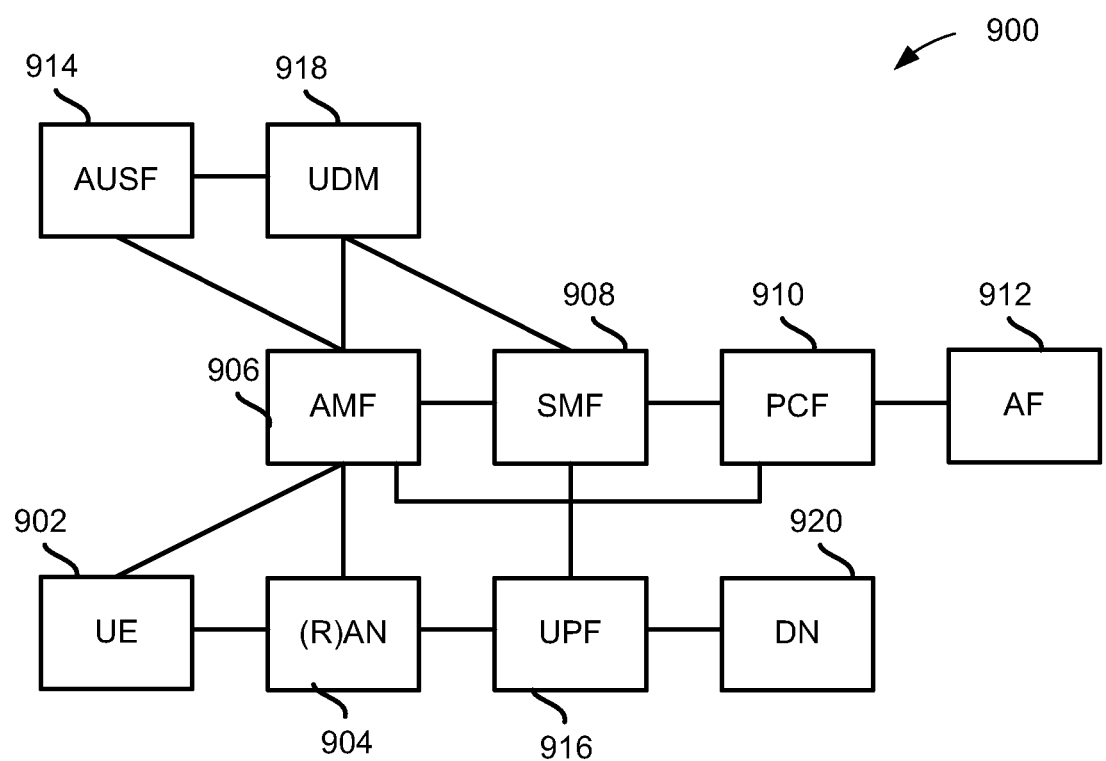
FIG. 9 illustrates an exemplary network architecture of a next generation wireless network infrastructure.

FIG. 9 illustrates an exemplary network architecture 900 of a next generation wireless network infrastructure (i.e., 5G). A User Equipment (UE) 902, e.g., user device/station 210 in FIG. 2, may be connected to either an Access Network (AN) or a Radio AN ((R)AN) 904 as well as an Access and Mobility Function (AMF) 906. The RAN 904 may represent a base station or access node using, for example, evolved LTE while an AN may be a general base station including non-3GPP access, e.g., Wi-Fi. The core network generally may include the AMF 906, a Session Management Function (SMF) 908, a Policy Control Function (PCF) 910, an Application Function (AF) 912, an Authentication Server Function (AUSF) 914, a User Plane Function (UPF) 916, a User Data Management (UDM) 918, and a Data Network connection (DN) 920. More details regarding may be found in 3GPP TS 23.501: "System Architecture for the 5G System". One or more of the core network components and/or functions may be implemented, for instance, at a serving network 215 and/or 220 and/or a home network 230.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the description herein.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both non-transitory computer-readable storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for establishing a security context with a second network by a user device having a previously established first key with a first network, comprising:
generating, by the user device, a key identifier based on the first key;
forwarding, by the user device, the key identifier to the second network for forwarding to the first network to enable the first network to identify the first key;
obtaining, by the user device, a key value from the second network, wherein the key value is associated with a second key forwarded to the second network from the first network; and
generating, by the user device, the second key based on the first key and the key value thereby establishing a security context between the second network and the user device.

2. The method of claim 1, wherein the network identifier is further based on at least a portion of a network name of the second network.

3. The method of claim 1, wherein the user device establishes the first key with the first network when the user device registers through a third network.

4. The method of claim 1, wherein the first key is established between the user device and the first network as part of the execution of an authentication and key agreement protocol with the first network.

5. The method of claim 1, further comprising:
using, by the user device, the second key to generate at least one of an encryption key or an integrity key for protecting communications between the user device and the second network.

6. The method of claim 1, wherein the user device is a mobile device, the first network is a first public land mobile network, and the second network is a second public land mobile network.

7. The method of claim 1, wherein the second network includes a wireless local area network (WLAN) access network.

8. The method of claim 1, wherein the second network includes a fixed broadband access network.

9. The method of claim 1, wherein generating the key identifier is further based on at least a portion of a user device identifier.

10. The method of claim 1, wherein generating the key identifier is further based on a function call value.

11. The method of claim 1, wherein the first key is unknown to the second network.

12. The method of claim 1, wherein the first key is utilized as a basis to establish multiple security contexts with at least two distinct serving networks.

13. The method of claim 1, wherein the user device bypasses execution of an authentication and key agreement protocol with the first network when registering through the second network.

14. A user device for establishing a security context with a second network, comprising:

a communication interface for communicating with one or more networks; and a processing circuit coupled to the communication interface, the processing circuit configured to:
   obtain, by the user device, a network identifier for the second network;
   generate a key identifier based on a first key previously established between the user device and a first network;
   forward the key identifier to the second network for forwarding to the first network to enable the first network to identify the first key;
   obtain a second network value from the second network, wherein the second network value is associated with a second key forwarded to the second network from the first network; and
   generate the second key based on the first key and key value thereby establishing a security context between the second network and the user device.

15. The user device of claim 14, wherein the user device establishes the first key with the first network when the user device registers through a third network.

16. The user device of claim 14, wherein the first key is established between the user device and the first network as part of the execution of an authentication and key agreement protocol with the first network.

17. The user device of claim 15, wherein the user device bypasses execution of an authentication and key agreement protocol with the first network when registering through the second network.

18. The user device of claim 14, wherein the first key is utilized as a basis to establish multiple security contexts with at least two distinct serving networks.

19. A method, comprising:
   receiving, by a first network, a key identifier, wherein the key identifier is based on a first key;
   identifying, by the first network, the first key based on the key identifier;
   generating, by the first network, a second key based on the first key and a key value associated with a second network; and
   forwarding, by the first network, the second key to the second network for establishing a security context between the second network and a user device.

20. The method of claim 19, wherein the first key is established between the user device and the first network as part of the execution of an authentication and key agreement protocol with the first network.

21. The user device of claim 20, wherein execution of another authentication and key agreement protocol with the first network is bypassed when the user device registers through the second network.

22. The method of claim 19, wherein the first key has been pre-established by the user device when the user device registered through a third network.

23. The method of claim 19, wherein the first key is unknown to the second network.

24. The method of claim 19, wherein the first key is utilized as a basis to establish multiple security contexts with at least two distinct serving networks.

25. A first network device, comprising:
   a communication interface to communicate with other networks; and
   a processing circuit coupled to the communication interface, the processing circuit configured to:
     receive a key identifier, wherein the key identifier is based on a first key;
     identify the first key based on the key identifier;
     generate a second key based on the first key and a second network value key value associated with a second network; and
     forward the second key to the second network for establishing a security context between the second network and a user device.

26. The first network device of claim 25, wherein the first key is established between the user device and the first network as part of the execution of an authentication and key agreement protocol with the first network, and execution of another authentication and key agreement protocol with the first network is bypassed when the user device registers through the second network.

27. The first network device of claim 25, wherein the first key is unknown to the second network.

28. The first network device of claim 25, wherein the first key is utilized as a basis to establish multiple security contexts with at least two distinct serving networks.

* * * * *

UNITED STATES PATENT AND TRADEMARK OFFICE
CERTIFICATE OF CORRECTION

| | | |
|---|---|---|
| PATENT NO. | : 11,553,381 B2 | Page 1 of 1 |
| APPLICATION NO. | : 16/246349 | |
| DATED | : January 10, 2023 | |
| INVENTOR(S) | : Anand Palanigounder, Adrian Edward Escott and Soo Bum Lee | |

It is certified that error appears in the above-identified patent and that said Letters Patent is hereby corrected as shown below:

On the Title Page

Under abstract "28 Claims, 10 Drawing Sheets" should read --27 Claims, 10 Drawing Sheet--.

In the Claims

Column 14, Lines 28-30, Claim 2 is Cancelled.

Column 15, Lines 17-18, the term "key value" is replaced with "second network value".

Signed and Sealed this
Fourth Day of April, 2023

Katherine Kelly Vidal
*Director of the United States Patent and Trademark Office*